(12) United States Patent
Yamaguchi et al.

(10) Patent No.: US 10,199,168 B2
(45) Date of Patent: Feb. 5, 2019

(54) LAMINATED CERAMIC ELECTRONIC COMPONENT

(71) Applicant: TDK CORPORATION, Tokyo (JP)

(72) Inventors: Koichi Yamaguchi, Tokyo (JP); Keisuke Ishida, Tokyo (JP); Makoto Endo, Tokyo (JP); Shimpei Tanabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/003,216

(22) Filed: Jan. 21, 2016

(65) Prior Publication Data

US 2016/0217930 A1    Jul. 28, 2016

(30) Foreign Application Priority Data

Jan. 23, 2015  (JP) ................. 2015-010869

(51) Int. Cl.
| | | |
|---|---|---|
| *H01G 4/30* | (2006.01) | |
| *H01G 4/248* | (2006.01) | |
| *H01G 4/232* | (2006.01) | |
| *H01G 4/228* | (2006.01) | |
| *H01G 4/008* | (2006.01) | |
| *H01G 4/12* | (2006.01) | |

(52) U.S. Cl.
CPC .............. *H01G 4/30* (2013.01); *H01G 4/0085* (2013.01); *H01G 4/1227* (2013.01); *H01G 4/232* (2013.01)

(58) Field of Classification Search
CPC .......... H01G 4/30; H01G 4/248; H01G 4/232; H01G 4/228

USPC ..................... 361/321.1, 306.1, 306.3, 301.4
See application file for complete search history.

(56) References Cited

U.S. PATENT DOCUMENTS

| | | |
|---|---|---|
| 2009/0310278 A1 | 12/2009 | Tani |
| 2013/0107421 A1 | 5/2013 | Zenzai et al. |
| 2014/0347783 A1* | 11/2014 | Kisumi ............... H01B 1/22 361/301.4 |

FOREIGN PATENT DOCUMENTS

| | | |
|---|---|---|
| JP | 2010-021523 A | 1/2010 |
| JP | 2013-118356 A | 6/2013 |

\* cited by examiner

*Primary Examiner* — Eric Thomas
*Assistant Examiner* — Arun Ramaswamy
(74) *Attorney, Agent, or Firm* — Oliff PLC

(57) ABSTRACT

A laminated ceramic electronic component provided with a component main body formed by alternatively laminating multiple dielectric ceramic layers and multiple internal electrode layers, and external electrodes disposed on the end faces where the internal electrode layers of the component main body are exposed, wherein at least a part of the multiple internal electrode layers exposed on the end faces of the component main body are provided with end-face electrode portions that connect the adjacent internal electrode layers, the connecting portions are present between the end-face electrode portions and the dielectric ceramic layers that contact with the end-face electrode portions, and the external electrodes are disposed so that the end-face electrode portions are covered.

6 Claims, 5 Drawing Sheets

LAMINATED CERAMIC ELECTRONIC COMPONENT

The present invention relates to a laminated ceramic electronic component in which internal electrode layers and ceramic layers are alternatively laminated.

BACKGROUND

In recent years, as the electronic devices are asked to be smaller and thinner, the electronic components equipped in these electronic devices are also required to be downsized. Especially, with the need for thin household device, as a laminated ceramic capacitor has a limited mounting area, the downsized component is required to have a high capacitance.

On the basis of such a market demand, a laminated ceramic capacitor must have a big capacitance and a small size. Here, the electrostatic capacitance of the laminated ceramic capacitor is represented by formula 1.

$$C = \left(\frac{\varepsilon_r \times \varepsilon_0 \times S}{d}\right) \times n \quad \text{[Formula 1]}$$

C: electrostatic capacitance; $\varepsilon_r$: relative permittivity; $\varepsilon_0$: vacuum permittivity
S: overlapping area of internal electrodes; d: thickness of dielectric ceramic layer; n: number of laminated layers As the downsizing is highly demanded, the shape and the size of the laminated ceramic capacitor as well as the overlapping area of the internal electrodes are almost fixed. It can be seen from formula 1 that in order to increase the electrostatic capacitance of the laminated ceramic capacitor, adjustments can be made to increase the inherent relative permittivity of the ceramic material, decrease the thickness of the dielectric ceramic layer and also that of the internal electrode layer and increase the number of layers to be laminated.

However, as the relative permittivity is an inherent value depending on the substance, it will not increase to a large extent if no new dielectric material is discovered. Thus, the thickness of the internal electrode layer or the thickness of the dielectric ceramic layer will definitely need to be decreased. Therefore, the laminated ceramic capacitor is required to be formed by internal electrode layers and dielectric ceramic layers with a thickness of 0.60 μm or less.

Usually, in order to get the internal electrode layer and the dielectric ceramic layer thinner, the metal particles forming the internal electrode layer and dielectric ceramic particles forming the dielectric ceramic layer should be micronized powders.

However, if the micronized metal particles and dielectric ceramic particles are used, the reactivity of the metal particle is higher than that of the dielectric ceramic particle, and thus a big mismatch will generate at the temperature where contraction due to sintering begins. As a result, a structure is likely to appear that the internal electrode layer is introduced into the interior of the component main body and voids are generated between the internal electrode layer and the external electrode. In this way, the connection may not good and it is hard to guarantee the quality.

Therefore, Patent Document 1 has proposed a method in which the external electrode is formed directly by plating. In particular, with such a method, a plating film will also be disposed by using the exposure part of the end face of the internal electrode layer as the core even if the internal electrode layer is introduced into the interior of the component main body. As the plating film grows, the exposure parts of the internal electrode layers will connect to each other with the dielectric ceramic layers interposed thereamong so that the external electrode can be formed to be thin and flat.

In addition, Patent Document 2 has disclosed that a structure in which the poor connection between the internal electrode layer and the external electrode layer can be improved can be provided by performing a process where a ceramic element body with the end portion of the internal electrode introduced to the surface is prepared, a process where a resin electrode layer containing a first metal filler and a second metal filler is formed with the first metal filler having a first metal component and the second metal filler having a second metal component with a melting point higher than that of the first metal component, and a heating process where the electrode layer is heated to form an electrode which contains the first and the second metal components and the metal contained in the internal electrode and also has a metal layer on the surface of the ceramic element body.

PATENT DOCUMENT

Patent Document 1: JP-A-2010-21523
Patent Document 2: JP-A-2013-118356

SUMMARY

However, in Patent Document 1, as the external electrode is directly formed by plating, problems rise that the plating film and the component main body are not chemically bonded and the bonding strength between the plating film and the component main body are not sufficient. As a result, a technical problem exists that peeling is likely to happen at the interface between the plating film and the component main body in the bending strength test.

In addition, in Patent document 2, in the laminated ceramic capacitor where one dielectric ceramic layer is divided into several layers and the thickness is as thin as 0.6 μm or less, the internal electrodes introduced to the surface have a thin gap therebetween, so the first metal filler and the second metal filler are hard to intrude into the gap, leading to a technical problem that voids are generated between the external electrode and the dielectric ceramic layer interposed between internal electrodes. As a result, a technical problem rises that peeling may easily happen at the interface between the external electrode and the dielectric ceramic layer with the voids as the starting point in the bending strength test.

The present invention aims to provide a laminated ceramic electronic component which is capable of improving the poor connection and preventing the peeling at the interface between the external electrode and the component main body from happening in the bending strength test even if the dielectric ceramic layer and the internal electrode layer have been each divided into several thin layers.

In order to solve the technical problem mentioned above, the laminated ceramic electronic component according to the present invention is characterized in that it is provided with a component main body formed by alternatively laminating multiple dielectric ceramic layers and multiple internal electrode layers, and external electrodes disposed on the end faces where the internal electrode layers of the component main body are exposed, wherein at least part of the multiple internal electrode layers exposed on the side end faces of the component main body are provided with end-face electrode portions which connect with adjacent internal electrode layers, connecting portions are present between the end-face electrode portions and the dielectric ceramic layers that contact with the end-face electrode portions, and the external electrodes are disposed to cover the end-face electrode portions.

Here, the end-face electrode portion refers to the end portion of the internal electrode layer protruding to the external electrode side in a greater extent than the component main body. In addition, the connecting portion refers to the layer contacting the end-face electrode portion and the end portion of the dielectric ceramic layer, and it also contains discontinuous layers.

Such a structure is formed before the external electrodes are sintered, so the bonding area between the external electrode and the end-face electrode portion increases so that the bonding strength increases and the poor connection can be improved. Further, as a connecting portion is present at the interface between the end-face electrode portion and the dielectric ceramic layer, the voids between the end-face electrode portion and the end portion of the dielectric ceramic layer can be prevented from generating and the peeling at the interface between the external electrode and the component main body can be dramatically improved in the bending strength test.

The connecting portion is characterized in that it uses metal oxide as the main component, wherein said metal is the component of the internal electrode.

With such a structure, as the main component in the connecting portion contains the metal oxide, wherein said metal is the component of the internal electrode, the bonding between the connecting portion and the end portion of the dielectric ceramic layer can be improved and the peeling at the interface between the external electrode and the component main body can be greatly improved in the bending strength test.

In addition, the connecting portion is a layer that is very thin and contacts the end-face electrode portion and the end portion of the dielectric ceramic layer. The thickness is preferred to be 100 nm or less.

The subcomponent of the connecting portion contains at least one oxide of V, Cr, Cu, Mn, Mg, Si, Ti, Ba, Ca and Zr.

With such a structure, the connecting portion contains at least one oxide of V, Cr, Cu, Mn, Mg, Si, Ti, Ba, Ca and Zr, so its reactivity with the end-face electrode portion is good. Also, the bonding between the connecting portion and the end-face electrode portion can be improved and the peeling at the interface between the external electrode and the component main body can be greatly improved in the bending strength test.

In addition, an end-face electrode portion that connects at least 3 or more of internal electrode layers together is present among the end-face electrode portions, and the internal electrode layers connected together in 3 or more layers by an end-face electrode portion account for 10% or more of all the internal electrode layers.

That is, for example, if a laminated ceramic electronic component contains 300 internal electrode layers, 30 or more internal electrode layers are connected in 3 or more layers with an end-face electrode portion.

In the structure with such a ratio mentioned above, the bonding strength between the end-face electrode portion and the internal electrode layer will be improved and the peeling off at the interface between the external electrode and the component main body in the bending strength test can be greatly improved.

According to the present invention, a laminated ceramic electronic component can be provided in which poor connection can be improved and the peeling at the interface between the external electrode and the component main body in the bending strength test can be greatly improved even though the dielectric ceramic layer and the internal electrode layer are divided into multiple thin layers.

DETAILED DESCRIPTION OF EMBODIMENTS

Hereinafter, a laminated ceramic capacitor will be described as the preferable embodiment of the present invention. The same symbol is provided to the same component with repeated descriptions omitted. In addition, the drawings are exemplary that the size ratio among components or the shape of each component may be different from those of the real objects.

<Laminated Ceramic Capacitor>

Figure 1:
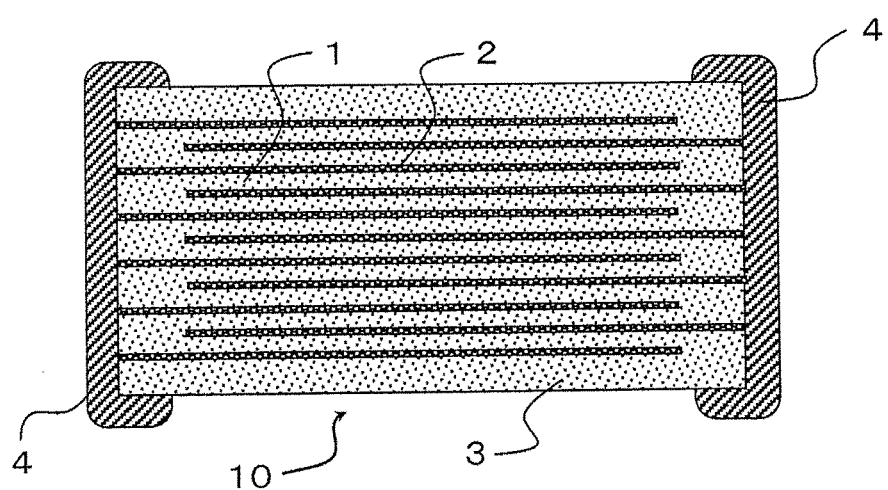
FIG. 1 is a schematic sectional view showing a laminated ceramic capacitor according to one embodiment of the present invention.

As shown in FIG. 1, a laminated ceramic capacitor 10 in one embodiment of the present invention is provided with a component main body 3 having a structure that dielectric ceramic layers 1 and internal electrode layers 2 are alternatively laminated. A pair of external electrodes 4 is formed at two end portions of the component main body 3 to be respectively connected with the internal electrode layers 2 alternatively disposed inside the component main body. The shape of the component main body 3 is not particularly restricted and is usually cuboid-shaped. In addition, its size is not particularly restricted either, and any proper size can be made according to the uses.

(Method for Preparing Laminated Ceramic Capacitor)

With respect to the method for preparing the laminated ceramic capacitor in the present embodiment, the component main body in a state where organic components are contained can be prepared by some well-known methods including the preparation of a paste for dielectric ceramic, the preparation of a paste for internal electrode, the preparation of a ceramic paste for a step absorbing layer, printing, laminating and cutting. Then, in order that the organic components are to be burned to carbonize them and the component main body is to be sintered, the component main body is obtained by performing a de-binder process and a firing process. Thereafter, the external electrode is formed on the end face of the sintered component main body, and a plating film is formed on the external electrode. In this way, the laminated ceramic capacitor is completed.

The preparation method will be described below in detail.

(Ceramic Composition of Dielectric Ceramic Layer)

The composition of the dielectric ceramic layer is not particularly restricted. The composition is preferable that $ABO_3$ (representing a perovskite typed crystal where the A site at least contains Ba and the B site at least contains Ti) is used as the main component and the sub-components contains Mg (0.01 mol or more and 2.00 mol or less, calculated in terms of MgO), R (R is at least one selected from the group consisting of Y, Dy, Ho, Yb, Lu, Gd and Tb) based compound (0.20 mol or more and 1.00 mol or less, calculated in terms of $R_2O_3$), $SiO_2$ (0.40 mol or more and 2.00 mol or less), Mn (more than 0.00 mol and less than 0.50 mol, calculated in terms of MnO) and V based compound (0.01 mol or more and 0.50 mol or less, calculated in terms of $V_2O_5$), all the contents being relative to 100 mol of $ABO_3$.

(Dielectric Ceramic Paste)

Dielectric ceramic powder with an average particle size of 20 nm to 100 nm is preferably used as the dielectric ceramic layer of the present invention. If the average particle size is controlled within the range, a dense dielectric green sheet can be prepared.

The dielectric ceramic paste can be prepared by mixing the dielectric ceramic particles, oxides or carbonates which are the sub-component, and an organic vehicle using a homo-mixer and then dispersing and kneading them in a three-roll mill, a ball mill or a bead mill so as to provide the composition of the dielectric ceramic layer mentioned above.

(Paste for Internal Electrode)

With respect to the conductive powder in the paste for internal electrode in the present invention, the particle size is not particularly restricted. A conductive powder with an average particle size of 10 nm to 150 nm is preferably used. In addition, as the dielectric ceramic powder added as an accessory material to delay the firing behavior of the conductive powder, a dielectric ceramic powder that has the same composition as that used in the dielectric ceramic paste and has an average particle size of approximately 10 nm to 50 nm is preferably used. The metal used as the conductive material is not particularly restricted, and Ni, Cu, Ni—Cu alloy, Ag—Pd alloy and the like can be used.

The paste for internal electrode can be prepared by mixing the prepared conductive powder, the dielectric ceramic powder used as the accessory material, and the organic vehicle using a homo-mixer and then dispersing and kneading them in a three-roll mill or a ball mill.

(Ceramic Paste for Step Absorbing Layer)

As for the composition of the step absorbing layer, the inorganic main component has the same inorganic composition as that of the dielectric ceramic layer while the sub-component is not particularly restricted and is preferably at least one selected from the group consisting of CuO, $Cr_2O_3$, MnO, $V_2O_5$, $SiO_2$, MgO, $TiO_2$, $BaCO_3$, $CaCO_3$, $ZrO_2$ in an amount of 0.01 mol or more and 2.00 mol or less. The paste for the step absorption layer can be prepared by mixing the prepared starting powder, a dispersant and an organic solvent using a homo-mixer, dispersing them in a bead mill, making the mixture as a slurry, adding the organic vehicle, mixing the resultant mixture in a homo-mixer, evaporating the organic solvent using an evaporator to a desired range, and at last kneading the mixture in a three-roll mill.

The organic vehicle mentioned above is obtained by dissolving a binder resin in a solvent. The binder resin used in the organic vehicle is not particularly restricted and can be various common binder resins such as ethyl cellulose, polyvinyl butyral, acryl resin and the like.

(Preparation of Laminated Ceramic Capacitor)

The thus prepared dielectric ceramic paste, the paste for the internal electrode and the ceramic paste for the step absorption layer are used to prepare the laminated ceramic capacitor.

First of all, in order to form a dielectric ceramic green sheet, the dielectric ceramic paste above is used to form a dielectric ceramic green sheet with a thickness of 0.6 μm or more and 0.9 μm or less on a carrier film 14 functioning as a support by a die coating method, a doctor blade method or the like, and the dielectric ceramic green sheet is dried later.

Then, in order to form a green layer of the internal electrode, the paste for the internal electrode mentioned above is used to form a green sheet of internal electrode with a thickness of preferably 0.7 μm or less on the dielectric ceramic green sheet by a printing method such as screen printing. Then, the obtained green sheet of the internal electrode is dried.

Further, in order to form a ceramic green layer of the step absorbing layer, the ceramic green layer of the step absorbing layer, which have a overlapping of about 10 μm with the green layer of internal electrode, with a thickness that is the same with that of the green layer of internal electrode is formed on the concave portion between green layers of internal electrode by a printing method such as screen printing on the dielectric ceramic green sheet, and then is dried. Here, the thus obtained green sheet is called the green sheet of capacitance part.

The carrier film is peeled off the obtained green sheet of capacitance part, and the green sheets of capacitor part are laminated in a desired number so as to prepare a green body with an electrostatic capacitance inside the laminated ceramic capacitor formed. Furthermore, with the green sheet formed by only dielectric ceramic green sheets, a laminate where desired layers are laminated is prepared in other ways. The layers are connected by hot pressing on the upper and lower surfaces of the green body.

Thereafter, the obtained component main body is cut into individual pieces. The method to provide individual pieces is not particularly restricted and can be a hay cutter method, a dicing blade method, a laser dicing method or the like.

(De-Binder Process)

The de-binder process is performed at a temperature kept at top of 650° C. or more and 850° C. or less in a nitrogen-hydrogen mixed gas with a partial pressure of oxygen of $10^{-21}$ atm or more and $10^{-16}$ atm or less and a hydrogen concentration of 0.1% or more and 4.0% or less. The temperature rising rate and the holding time are not particularly restricted, and the content of remaining carbon may be 0.1 mass % or less. If the de-binder temperature is decreased, more carbons are remained. Thus, as more carbons are removed from the component main body in the firing process, delamination is likely to happen.

(Thermal Treatment Process)

A special hot press sintering method can be employed as the thermal treatment process in one embodiment of the present invention since a structure used in the present invention is to be prepared which has the end-face electrode portion and the connecting portion. However, the effect of the present invention is based on the structure, various firing methods such as the roller hearth kiln firing, hot isostatic pressing, batch furnace firing or the like can be used together with any dielectric ceramic paste, any paste for internal electrode and any paste for step absorption layer as long as the method will produce the structure of the present invention.

Figure 2:
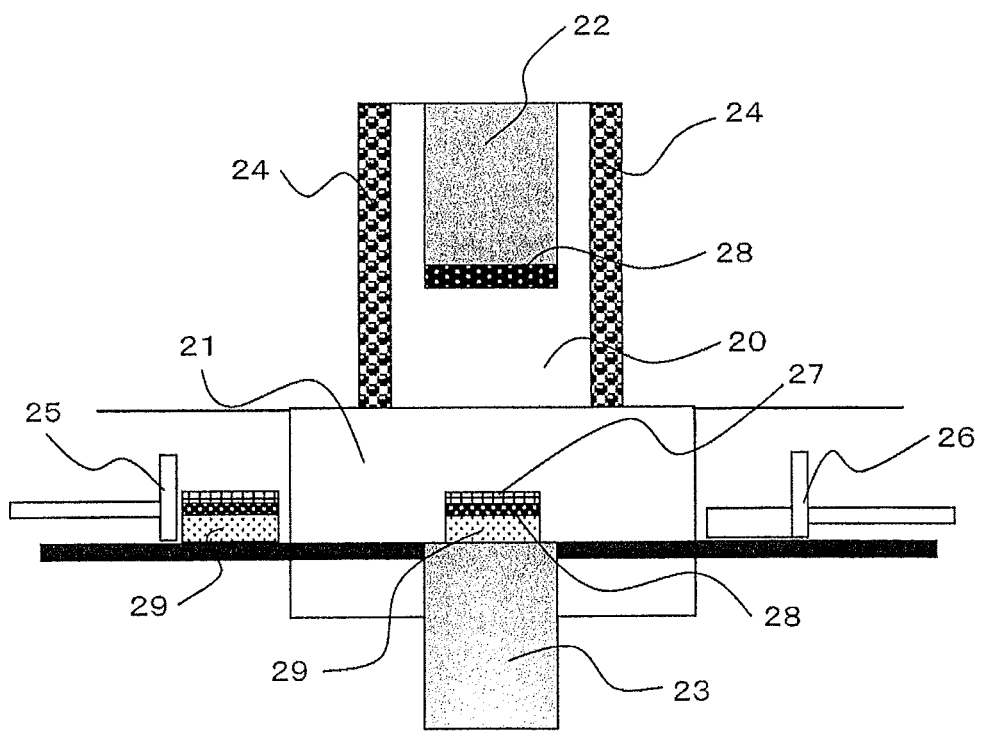
FIG. 2 is a schematic view showing a hot press firing furnace according to one embodiment of the present invention.
Figure 3:
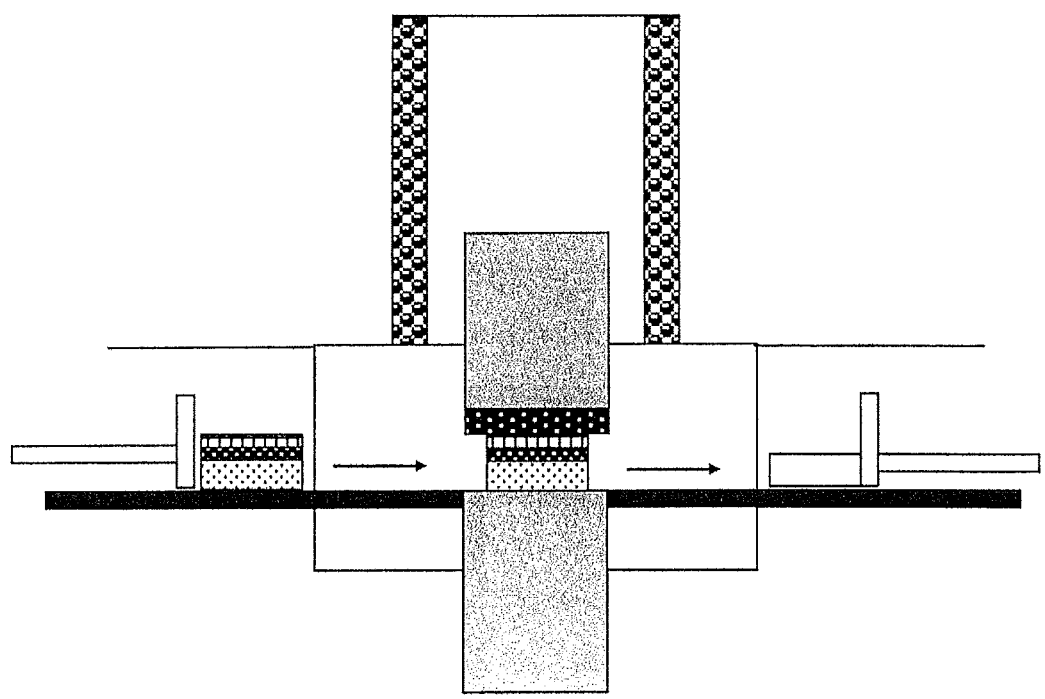
FIG. 3 is a schematic view showing a hot press firing furnace during firing according to one embodiment of the present invention.

The hot press firing in one embodiment of the present invention is performed through a furnace for continuous hot press firing with a high rate, as shown in FIG. 2 and FIG. 3.

As shown in FIG. 2, the furnace for continuous hot press firing with a high rate in the present invention is provided with a heating chamber having a pressure punch 20, a pressurizing chamber 21, a punch 22, a stage 23, a heater 24, a pusher 25 and a receiving plate 26. The sample of component main body 27 is placed on a high-strength plate 28 which is mounted on a ceramic stand 29 and also the bottom of the punch 22.

As shown in FIG. 3, in the furnace for continuous hot press firing with a high rate in the present invention, the sintering process is performed in which the sample of component main body 27 is transferred to the stage 23 by the pusher 25, placed on the ceramic stand 29 and the high-strength plate 28, and then pressed and heated with the punch 22 and the high-strength plate 28 which have been heated from 1200° C. to 1300° C. in the heating chamber having a pressure punch 20. The sintered sample of component main body is sent to the exterior of the pressurizing chamber 21 by the receiving plate 26.

As the conditions for the firing process, for example, the temperature rising rate can be 7000° C./h or more and 100000° C./h or less, and the pressure to be added is 1.0 MPa or more and 80 MPa or less.

The atmosphere during firing is preferably one where nitrogen, hydrogen and vapor are present with the hydrogen concentration being higher than 0.1% and 4.0% or less. If the hydrogen concentration is too high, it is not preferable because the carbon remaining in the de-binder process will also remain in the firing process and the condition for re-oxidization will involve a higher temperature. In contrast, if the hydrogen concentration is too low, the conductive powder will be oxidized, which is not to be selected preferably.

As the high-strength plate mentioned above, a material with a high hot shock resistance and a high bending strength can be listed such as tungsten carbide, silicon carbide, silicon nitride and the like. From the viewpoint of the reactivity with the sample, silicon carbide is preferable.

The pressure punch mentioned above can be made of a material with a high thermal conductivity such as silicon carbide, aluminum nitride and the like. From the viewpoint of the thermal resistance and the thermal conductivity, silicon carbide is preferable.

The ceramic stand mentioned above is made of a material with a low thermal conductivity such as the stabilized zirconia, alumina, silicon nitride and the like. From the viewpoint of the hot shock resistance and the thermal conductivity, the stabilized zirconia and silicon nitride are preferably used.

A re-oxidization treatment is provided to thus sintered component main body. In the re-oxidization treatment, pressure is applied inside a hot pressing device. Alternatively, re-oxidization treatment is performed by a batch furnace, a continuous furnace or the like. In addition, the re-oxidization treatment is usually done in an atmosphere where nitrogen and vapor are present with the partial pressure of oxygen controlled at $10^{-8}$ atm to $10^{-4}$ atm. The temperature is preferably kept at 800° C. to 950° C. If the holding temperature in annealing is below the temperature range mentioned above, the re-oxidation of the dielectric material will not be sufficient so that the insulation resistance and the life-time properties will deteriorate. Besides, if the temperature is above the range, it is hard to provide the structure of the present invention.

With this process mentioned above, the conductive material of the internal electrode layer is pushed out of the component main body and immersed in the end portion of the dielectric ceramic layer when it is brought into contact with the adjacent internal electrode layer so as to form the end-face electrode portion. In addition, the connecting portion is formed through the reaction at the interface between the end-face electrode portion and the oxides in the end portion of the dielectric ceramic layer during the temperature dropping stage after the end-face electrode portion is formed.

In one embodiment of the present invention, the structure of the present invention is prepared by using the method above. However, even if the commonly used hot press sintering or compression sintering is not applied, the structure can also be formed by coating Ni paste on the end portion elongating from the internal electrode layer of the component main body and then providing a firing process with a controlled atmosphere. The method to form the structure of the present invention is not limited to those mentioned above.

As such, the structure of the present invention can be obtained by subjecting a thermal treatment to the component main body produced by using the mentioned dielectric ceramic paste and the paste for the internal electrode. The most preferable embodiment of the structure in the present invention will be described with reference to FIG. 4.

Figure 4:
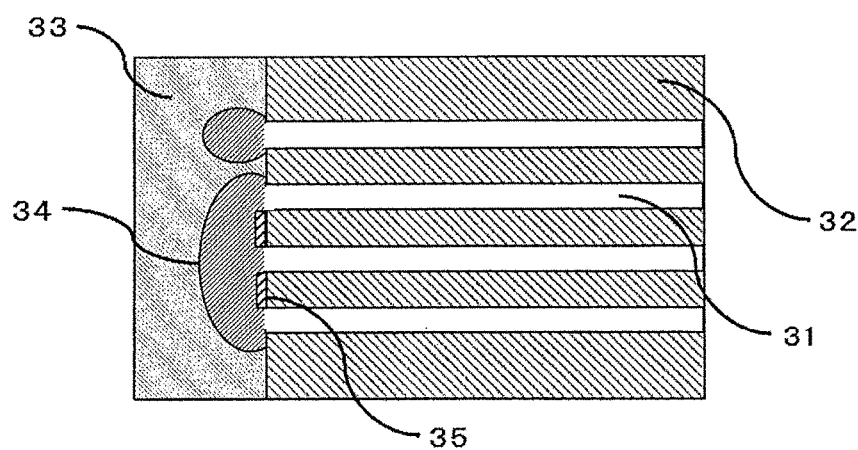
FIG. 4 is a view of part of the cross-section in a laminated ceramic capacitor showing the internal structure of the laminated ceramic capacitor of the present invention.

FIG. 4 is a view showing part of the enlarged internal structure in the laminated ceramic capacitor as shown in FIG. 1 which is a schematic sectional view.

If the cross-section showing the internal structure of the laminated ceramic capacitor of the present invention is enlarged, as shown in FIG. 4, the capacitor is composed of internal electrode layers 31, dielectric ceramic layers 32, external electrodes 33, end-face electrode portions 34 and connecting portions 35. Here, the end-face electrode portion 34 refers to the end portion of the internal electrode layer 31 protruding to the external electrode 33 in a greater extent than the component main body. The connecting portion 35 is present at the interface between the end-face electrode portion 34 and the end portion of the dielectric ceramic layer 32.

As shown in FIG. 4, the internal structure of the laminated ceramic capacitor in the present invention has end-face electrode portions composed of components from the internal electrode layer, so the poor connection between the external electrode and the internal electrode can be improved. Further, as a connecting portion which connects the end portion of the dielectric ceramic layer and the end-face electrode portion is contained, the connection between the component main body and the external electrode can be good, and a good result can be provided that the peeling occurred at the interface between the external electrode and the component main body in the bending strength test can be greatly improved.

Further, the connecting portion preferably uses the metal oxide as the main component and can be, for example, NiO or CuO, wherein said metal is the component of the internal electrode.

With such a structure, as the main component of the connecting portion contains the metal oxide, wherein said metal is the component of the internal electrode, the bonding between the connecting portion and the end portion of the dielectric ceramic layer can be improved and the peeling occurred at the interface between the external electrode and the component main body in the bending strength test can be greatly improved.

The thickness of the connecting portion is not particularly restricted. It is approximately 1 nm or more and 5 nm or less as the connecting portion is formed at the interface. Further, a connecting portion must be formed at the interface between the end-face electrode portion and the end portion of the dielectric ceramic layer.

Besides, the connecting portion preferably contains at least one selected from the oxides of V, Cr, Cu, Mn, Mg, Si, Ti, Ba, Ca and Zr as the sub-component, and V, Cr, Mn and Cu are more preferable.

With such a structure, as the connecting portion contains at least one selected from the oxides of V, Cr, Cu, Mn, Mg, Si, Ti, Ba, Ca and Zr as the sub-component, its reactivity with the end-face electrode portion is good. Thus, the bonding between the connecting portion and the end-face electrode portion is improved, and the peeling occurred at the interface between the external electrode and the component main body in the bending strength test can be greatly improved.

An end-face electrode portion that connects at least 3 or more of internal electrode layers is present among the end-face electrode portions, and the ratio occupied by the internal electrode layers connected together in 3 or more layers by an end-face electrode portion is preferably 10% or more.

With such a structure having such a ratio, the bonding strength between the end-face electrode portion and the internal electrode layer is improved, and the peeling occurred at the interface between the external electrode and the component main body in the bending strength test can be greatly improved. If less than 10% of internal electrode layers are connected in 3 or more layers relative to all the internal electrode layers, the effect produced by the presence of the end-face electrode portion and the connecting portion will be less good and peeling may occur at the interface between the external electrode and the component main body in the bending strength test.

(Paste for External Electrode)

The paste for external electrode in the present invention can be prepared by mixing a conductive powder as the main component, a glass powder as the sub-component and the organic vehicle using a three-roll mill or the like. The conductive powder is not particularly restricted, and a powder containing at least Cu and having an average particle size of 0.3 μm to 7.0 μm is preferably used. When the average particle size is controlled within this range, a dense external electrode can be prepared.

Part of the sintered component main body is immersed in the paste for external electrode prepared by the method above and then is sintered to form the external electrode. The sintering condition for the external electrode is preferably, for example, holding for about 10 minutes to 1 hour at a temperature of 600° C. to 850° C. in an atmosphere where humidified nitrogen and hydrogen are both present.

The method for forming plating film is not particularly restricted. As for a sintered body with external electrodes formed, a Ni plated layer and a Sn plated layer are formed in order on the external electrode to generate a Ni/Sn plated layer by barrel plating using a Ni plating bath and a Sn plating bath. As such, a laminated ceramic capacitor having the structure of the present invention will be produced.

One embodiment of the present invention has been described above. However, the present invention is not limited to the foregoing embodiment and can be modified in various ways without departing the spirit and scope of the present invention.

Example 1

Hereinafter, the present invention will be described below based on more detailed examples, and various modifications can be made without departing from the spirit and scope of the present invention.

(Preparation of Powder for Dielectric Ceramic Paste)

In the present example, a laminated ceramic capacitor was prepared to have a dielectric layer with a composition of $(Ba_{0.96}Ca_{0.04})(Ti_{0.85}Zr_{0.15})O_3 + MgO$ (0.1 parts by mass) + MnO (0.3 parts by mass) + $Y_2O_3$ (0.4 parts by mass) + $SiO_2$ (0.3 parts by mass) + $V_2O_5$ (0.05 parts by mass). First of all, starting powders of $BaTiO_3$, $CaTiO_3$, $BaZrO_3$, $MgCO_3$, $MnCO_3$, $Y_2O_3$ and $SiO_2$ having a particle size of 0.1 to 1 μm were subjected to a wet mixing for 16 hours by a ball mill. The mixture was dried to prepare a dielectric powder.

Then, relative to 100 parts by mass of the dielectric powder, 4.8 parts by mass of acryl resin, 100 parts by mass of ethyl acetate, 6 parts by mass of mineral spirit and 4 parts by mass of toluene were mixed by the ball mill and then made as a paste. In this way, a dielectric ceramic paste was obtained.

(Preparation of Paste for Internal Electrode)

Then, relative to 100 parts by mass of Ni particles with an average particle size of 0.15 μm, 40 parts by mass of an organic vehicle (a mixture obtained by dissolving 8 parts by mass of ethyl cellulose in 92 parts by mass of butyl carbitol) and 10 parts by mass of butyl carbitol were kneaded to be a paste by a three-roll mill to provide a paste for the internal electrode layer.

(Preparation of Ceramic Paste for Step Absorbing Layer)

An inorganic starting material having a composition that is same as that of the dielectric ceramic paste was mixed with methyl ethyl ketone where a dispersant was dissolved, and the mixture was mixed and stirred by a homo-mixer to be slurry. Then, zirconia beads of φ 0.5 mm were used for pulverization and mixing for 24 hours.

An organic vehicle was added into the slurry, and zirconia beads of φ 0.5 mm were used for pulverization and mixing for 24 hours. Thereafter, the organic solvent was evaporated by an evaporator to adjust the concentration of inorganic materials. The remaining was mixed in the three-roll mill to provide a ceramic paste for step absorbing layer.

(Preparation of Laminated Ceramic Capacitor)

A dielectric green sheet was formed on a carrier film functioning as a support by a doctor blade method using the dielectric ceramic paste. The thickness of the dielectric green sheet was adjusted in such a manner that each dielectric ceramic layer inside the component main body had a thickness of 0.5 μm.

Then, the paste for internal electrode was used to form the internal electrode layer. In particular, the internal electrode pattern was formed on the dielectric green sheet by screen printing.

Further, in order to form the step absorbing layer, the ceramic paste for step absorption layer was screen-printed on the concave portion between internal electrode patterns and was then dried. In this way, a green sheet of capacitance part was prepared.

In addition, besides the green sheet for internal layer, the green sheet for outer layer were prepared separately, wherein only dielectric green sheet was formed on the carrier film to obtain the green sheet for outer layer.

Then, a desired number of green sheets of capacitance part were laminated, and also a desired number of the green sheets for outer layer were laminated. After each laminating, the carrier film was peeled off.

The obtained component main body was cut by a dicing saw.

Thereafter, the individual pieces of the component main body after cutting were arranged on a high-strength plate with a spacing of 0.1 mm, and the de-binder process was subjected to the individual pieces together with the high-strength plate.

In the present example, silicon carbide was used as the high-strength plate.

The condition for de-binder process was that the holding time was 12 hours, the holding temperature was 800° C., and the atmosphere was a humidified nitrogen-hydrogen mixed gas with the hydrogen concentration of 4.0%. The temperature rising rate was not particularly restricted, and the process was performed until the remaining carbon content turned to 0.1 mass % or less.

The hot press firing device as shown in FIG. 2 was used to sinter the component main body on the high-strength plate at a sintering temperature of 1100° C. with an applied pressure of 5 MPa after de-binder process, wherein the temperature rising rate was approximately 86400° C./h.

The atmosphere during firing was a humidified mixed gas of nitrogen and hydrogen with a partial pressure of oxygen being $10^{-10}$ atm.

As the materials in the hot press firing device mentioned above, in the present example, silicon carbide was used for the pressure punch and silicon nitride was used for the ceramic stand.

A re-oxidization treatment was provided to thus sintered component main body. In the present invention, the re-oxidization treatment was performed in non-pressurization batch furnace in an atmosphere controlled at $10^{-5}$ atm where nitrogen and vapor were present together. In addition, the holding temperature was 950° C.

Here, a paste for external electrode was prepared by kneading Cu powder which functioned as a conductive powder and had an average particle size of 0.8 μm with an organic vehicle in a three-roll mill.

Then, part of the sintered component main body was immersed in the paste for external electrode and then dried and sintered in nitrogen gas. The temperature rising rate was not particularly restricted. The holding temperature was 800° C. and the holding time was 20 minutes.

In the component main body with external electrodes formed, a Ni plated layer and a Sn plated layer were formed in order on the external electrode to generate a Ni/Sn plated layer by barrel plating using a Ni plating bath and a Sn plating bath. As such, a laminated ceramic capacitor having the structure of the present invention was produced.

Example 2

A laminated ceramic capacitor was prepared similarly as in Example 1 except that 0.7 parts by mass of $Cr_2O_3$ was additionally added to the paste for step absorbing layer.

Example 3

A laminated ceramic capacitor was prepared similarly as in Example 1 except that 0.7 parts by mass of CuO was additionally added to the paste for step absorbing layer.

Example 4

A laminated ceramic capacitor was prepared similarly as in Example 1 except that 0.7 parts by mass of MnO was additionally added to the paste for step absorbing layer.

Example 5

A laminated ceramic capacitor was prepared similarly as in Example 1 except that 0.7 parts by mass of $V_2O_5$ was additionally added to the paste for step absorbing layer.

Example 6

A laminated ceramic capacitor was prepared similarly as in Example 1 except that the pressure to be applied during firing was changed to 10 MPa. In addition, the thickness of the dielectric green sheet was adjusted in such a manner that each dielectric ceramic layer inside the component main body had a thickness of 0.5 μm.

Example 7

A laminated ceramic capacitor was prepared similarly as in Example 1 except that the pressure to be applied during firing was changed to 15 MPa. In addition, the thickness of the dielectric green sheet was adjusted in such a manner that each dielectric ceramic layer inside the component main body had a thickness of 0.5 μm.

Example 8

A laminated ceramic capacitor was prepared similarly as in Example 1 except that the pressure to be applied during firing was changed to 20 MPa. In addition, the thickness of the dielectric green sheet was adjusted in such a manner that each dielectric ceramic layer inside the component main body had a thickness of 0.5 μm.

Example 9

A laminated ceramic capacitor was prepared similarly as in Example 1 except that the pressure to be applied during firing was changed to 40 MPa. In addition, the thickness of the dielectric green sheet was adjusted in such a manner that each dielectric ceramic layer inside the component main body had a thickness of 0.5 μm.

Example 10

A laminated ceramic capacitor was prepared similarly as in Example 7 except that 0.7 parts by mass of $Cr_2O_3$ was additionally added to the paste for step absorbing layer.

Comparative Example 1

A laminated ceramic capacitor was prepared similarly as in Example 1 except that a roller hearth kiln firing device was used. The atmosphere during firing was a humidified mixed gas of nitrogen and hydrogen, and the firing process was performed with a partial pressure of oxygen of $10^{-10}$ atm.

Comparative Example 2

A laminated ceramic capacitor was prepared similarly as in Comparative Example 1 except that the paste for external electrode was changed in composition and the temperature and the atmosphere during the sintering of the paste for external electrode were also changed. The paste for external electrode was prepared by weighing 25.6 parts by weight of Sn which functioned as a first conductive filler, 60 parts by weight of Ag which functioned as a second conductive filler and 14.4 parts by weight of a thermosetting epoxy resin and then kneading them in a three-roll mill. The conditions during the sintering process were that the temperature was at 520° C. and the atmosphere was nitrogen gas with a partial pressure of oxygen of $10^{-6}$ atm. The structure of the laminated ceramic capacitor prepared by the above preparation method was one in which at least one group of the exposed portions of adjacent internal electrodes at the side face of the component main body were connected by the connecting portion elongating from the internal electrode, so the bonding area between the external electrode and the internal electrode was sufficiently large so that the electrostatic capacitance can be prevented from decreasing.

The obtained laminated ceramic capacitor excluding the external electrodes was in such a state that the number of internal electrode layers interposed between dielectric ceramic layers was 270, each dielectric ceramic layer inside the component main body had a thickness of 0.5 μm, the thickness of the internal electrode layer was 0.4 μm, the thickness of the outer layer portion was 25 μm, and the capacitance was 4.7 μF.

(Assessment on Laminated Ceramic Capacitor)

For the prepared laminated ceramic capacitors, the presence of end-face electrode portion, the ratio occupied by the internal electrode layer connected by the end-face electrode portion in 3 or more layers, the presence of the connecting portion, the main component of the connecting portion, the sub-component of the connecting portion, the electrostatic capacitance and the bending strength were assessed by the following assessment method.

(Assessment on Presence of End-Face Electrode Portion)

In the method for assessing the presence of the end-face electrode portion, the cross-section of the prepared laminated ceramic capacitor was observed with a field emission scanning electron microscope (FE-SEM) after 5000-fold enlarged so as to assess the thickness of the dielectric ceramic layer and the internal electrode layer and the presence or not of the end-face electrode portion.

(Assessment on Presence of Connecting Portion, Main Component of Connecting Portion and Sub-Component of Connecting Portion)

The assessment on the presence of the connecting portion, the main component of the connecting portion and the sub-component of the connecting portion was performed by observing the 500000-fold enlarged connecting portion of the prepared laminated ceramic capacitor using a energy dispersive spectrometer (EDS) attached to the scanning transmission electron microscope and then doing a line analysis for the visual fields.

(Ratio Occupied by Internal Electrode Layer Connected by End-Face Electrode Portion in 3 or More Layers)

The assessment on the ratio occupied by the internal electrode layer connected by the end-face electrode portion in 3 or more layers was performed by observing 10 visual fields at the 5000-fold enlarged cross-section of the prepared laminated ceramic capacitor using a field emission scanning electron microscope (FE-SEM), counting the number of internal electrode layers connected by the end-face electrode portion in 3 or more layers, and then calculating the ratio relative to number of all the internal electrode layers.

(Electrostatic Capacitance)

The electrostatic capacitance was measured in the prepared laminated ceramic capacitor by a LCR meter (4284A, prepared by HP Development Company) with 1.0 Vrms under 1 kHz so as to obtain the effective electrostatic capacitance.

(Assessment in Bending Strength Test)

The prepared laminated ceramic capacitor was mounted on a glass-epoxy substrate using a tin solder (Sn 96.5%-Ag 3%-Cu 0.5%). Then, a bending strength tester applied a bending stress to the glass-epoxy substrate at the bottom side of the mounting portion of the chip typed electronic component so as to perform the substrate bending test.

The results about the presence of end-face electrode portion, the ratio occupied by the internal electrode layer connected by the end-face electrode portion in 3 or more layers, the presence of the connecting portion, the main component of the connecting portion, the sub-component of the connecting portion, the electrostatic capacitance and the bending strength from Example 1 and Comparative Examples 1 to 2 were shown in Table 1.

TABLE 1

|  | Presence of end-face electrode portion | Ratio occupied by internal electrode layer connected by end-face electrode portion in 3 or more layers | Presence of connecting portion | Main component of connecting portion | Sub-component of connecting portion | Capacitance (μF) | Bending strength |
|---|---|---|---|---|---|---|---|
| Example 1 | Yes | 8% | Yes | NiO | — | 4.7 | 1/100 |
| Comparative Example 1 | No | — | No | — | — | 4.2 | 5/100 |
| Comparative Example 2 | No | — | No | — | — | 4.6 | 8/100 |

In Example 1, the ratio occupied by the internal electrode layer connected by the end-face electrode portion in 3 or more layers was low, but a lot of internal electrode layers connected by the end-face electrode portion in two layers were observed.

As shown in Table 1, if the sintering was done with no pressure as in Comparative Example 1, the bonding area between the external electrode and the internal electrode was not sufficiently large, leading to decrease of capacitance.

As shown in Table 1, if the paste for external electrode was changed as in Comparative Example 2, the bonding area between the external electrode and the internal electrode was not sufficiently large, leading to decrease of capacitance. It could be seen that the defective product could not be prevented from generating in the bending strength test. In the laminated ceramic capacitor with multiple thin layers, the generation of voids between the external electrode and the component main body could not be prevented, and peeling was consider to occur at the interface between the external electrode and the component main body in the bending strength test.

It could be known from Table 1 that the structure from Example 1 of the present invention would not have its electrostatic capacitance decreased. The poor connection was thought to be improved by increasing the bonding area between the end-face electrode portion and the external electrode. Further, it was known that the generation of defective products could be prevented in the bending strength test. The reason for the good quality was that there was a connecting portion between the end-face electrode portion and the end portion of the dielectric ceramic layer. In this respect, no void existed so that the peeling at the interface between the external electrode and the component main body was prevented.

The results about the presence of end-face electrode portion, the ratio occupied by the internal electrode layer connected by the end-face electrode portion in 3 or more layers, the presence of the connecting portion, the main component of the connecting portion, the sub-component of the connecting portion, the electrostatic capacitance and the bending strength from Examples 2 to 10 were shown in Table 2.

ceramic layer was prevented from generating so that the poor connection was improved. Thus, the peeling generated at the interface between the external electrode and the component main body could be greatly inhibited in the bending strength test.

The present invention is not limited to the foregoing examples. The compositions of the dielectric ceramic material and the material for internal electrode, the thickness of the internal electrode layer, the thickness of the dielectric ceramic layer, the thickness of the external electrode layer and the thermal treatment process can be modified within the scope of the present invention.

The present invention can provide a downsized laminated ceramic electronic component with a high capacitance. The laminated ceramic electronic component with a good reliability is capable of improving the poor connection and providing excellent performance in the bending strength test even though the dielectric ceramic layer and the internal electrode layer have been divided into multiple thin layers.

DESCRIPTION OF REFERENCE NUMERALS

1 Dielectric ceramic layer
2 Internal electrode layer
3 Component main body

TABLE 2

| | Presence of end-face electrode portion | Ratio occupied by internal electrode layer connected by end-face electrode portion in 3 or more layers | Presence of connecting portion | Main component of connecting portion | Sub-component of connecting portion | Capacitance (μF) | Bending strength |
|---|---|---|---|---|---|---|---|
| Example 2 | Yes | 8% | Yes | NiO | Cr | 4.7 | 4/1000 |
| Example 3 | Yes | 9% | Yes | NiO | Cu | 4.7 | 6/1000 |
| Example 4 | Yes | 8% | Yes | NiO | Mn | 4.7 | 3/1000 |
| Example 5 | Yes | 8% | Yes | NiO | V | 4.7 | 4/1000 |
| Example 6 | Yes | 10% | Yes | NiO | — | 4.7 | 5/1000 |
| Example 7 | Yes | 21% | Yes | NiO | — | 4.7 | 3/1000 |
| Example 8 | Yes | 51% | Yes | NiO | — | 4.7 | 1/1000 |
| Example 9 | Yes | 100% | Yes | NiO | — | 4.7 | 0/1000 |
| Example 10 | Yes | 20% | Yes | NiO | Cr | 4.7 | 1/1000 |

As shown in Table 2, it was known that the structures in Example 2 to Example 5 of the present invention could prevent the generation of defective products in the bending strength test. It was considered that the reason for good quality might be that the connecting portion contained the oxide of Cr, Cu, Mn or V as the sub-component so that the bonding strength between the connecting portion and the end-face electrode portion was improved.

As shown in Table 2, it was seen that the structures in Example 6 to Example 10 of the present invention could further prevent the generation of defective products in the bending strength test. The reason might be that the bonding strength between the end-face electrode portion and the internal electrode layer was improved with the end-face electrode portion which connected 3 or more layers of internal electrode layers together.

Figure 5:
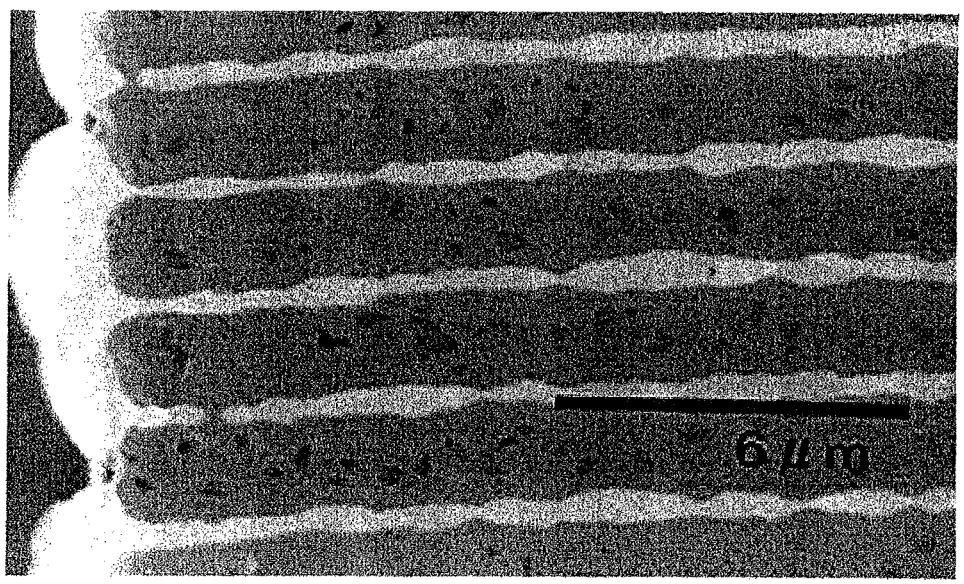
FIG. 5 is a field emission-scanning electron micrograph (FE-SEM) showing part of the cross-section of a protruding part inside a laminated ceramic capacitor prepared in Example 7 with the external electrode not formed yet according to one embodiment of the present invention.

FIG. 5 was a sectional view showing the sample from Example 7 observed before the external electrode was sintered. It could be seen from FIG. 5 that the end-face electrode portion and the end portion of the dielectric ceramic layer were closely connected and the connecting portion was contained. In addition, as such a structure was present in a high ratio, the voids between the end-face electrode portion and the end portion of the dielectric 4 External electrode
10 Laminated ceramic capacitor
20 Heating chamber having a pressure punch
21 Pressurizing chamber
22 Punch
23 Stage
24 Heater
25 Pusher
26 Receiving plate
27 Sample of component main body
28 High-strength plate
29 Ceramic stand
31 Internal electrode layer
32 Dielectric ceramic layer
33 External electrode
34 End-face electrode portion
35 Connecting portion

What is claimed is:
1. A laminated ceramic electronic component comprising:
a component main body formed by alternatively laminating multiple dielectric ceramic layers and multiple internal electrode layers, the multiple internal electrode layers having exposed end faces,
external electrodes disposed on the exposed end faces, homogeneous end-face electrode portions that connect adjacent of the multiple internal electrode layers, and connecting portions between the end-face electrode portions and the dielectric ceramic layers that contact the end-face electrode portions, wherein:

the external electrodes are disposed to cover the end-face electrode portions, the end-face electrode portions completely surround an outer face of the corresponding connecting portions, and a main component of the connecting portions comprises an oxide of a metal which is a component of the internal electrode layers.

2. The laminated ceramic electronic component of claim 1, wherein, there are end-face electrode portions that connect at least 3 or more of internal electrode layers among the end-face electrode portions, and the ratio of the internal electrode layers connected together in 3 or more layers by the end-face electrode portions is 10% or more.

3. The laminated ceramic electronic component of claim 1, wherein, a sub-component of the connecting portions comprises at least one of oxides of V, Cr, Cu, Mn, Mg, Si, Ti, Ba, Ca and Zr.

4. The laminated ceramic electronic component of claim 3, wherein, there are end-face electrode portions that connect at least 3 or more of internal electrode layers among the end-face electrode portions, and the ratio of the internal electrode layers connected together in 3 or more layers by the end-face electrode portions is 10% or more.

5. A laminated ceramic electronic component comprising:

a component main body formed by alternatively laminating multiple dielectric ceramic layers and multiple internal electrode layers, the multiple internal electrode layers having exposed end faces, external electrodes disposed on the exposed end faces, homogeneous end-face electrode portions that connect adjacent of the multiple internal electrode layers, and connecting portions between the end-face electrode portions and the dielectric ceramic layers that contact the end-face electrode portions, wherein:

the external electrodes are disposed to cover the end-face electrode portions, the end-face electrode portions completely surround an outer face of the corresponding connecting portions, and a sub-component of the connecting portions comprises at least one of oxides of V, Cr, Cu, Mn, Mg, Si, Ti, Ba, Ca and Zr.

6. The laminated ceramic electronic component of claim 5, wherein, there are end-face electrode portions that connect at least 3 or more of internal electrode layers among the end-face electrode portions, and the ratio of the internal electrode layers connected together in 3 or more layers by the end-face electrode portions is 10% or more.

* * * * *